United States Patent [19]

Nicholson

[11] Patent Number: 4,692,241

[45] Date of Patent: Sep. 8, 1987

[54] SEWAGE TREATMENT BIOLOGICAL ROTORS

[75] Inventor: John L. Nicholson, Thame, United Kingdom

[73] Assignee: Klargester Environmental Engineering Ltd., Aylesbury, United Kingdom

[21] Appl. No.: 808,429

[22] Filed: Dec. 12, 1985

[30] Foreign Application Priority Data

Dec. 18, 1984 [GB] United Kingdom ................. 8431866
Jun. 11, 1985 [GB] United Kingdom ................. 8514680

[51] Int. Cl.[4] ............................................. C02F 3/08
[52] U.S. Cl. ................................... 210/150; 210/232
[58] Field of Search .............................. 210/150, 232

[56] References Cited

U.S. PATENT DOCUMENTS

| 4,149,972 | 4/1979 | Iwai et al. | 210/150 |
| 4,385,987 | 5/1983 | McGinley et al. | 210/150 |
| 4,444,658 | 4/1984 | Hankes et al. | 210/150 |
| 4,549,962 | 10/1985 | Koelsch | 210/150 |

Primary Examiner—Tom Wyse
Attorney, Agent, or Firm—Michael J. Striker

[57] ABSTRACT

A biological rotor for biomass treatment in a sewage treatment plant is erected from sector shaped packs removably attached between spider-like support assemblies each of which comprises a ring and radial channel-shaped arms. The packs include support members. One of the support members has its ends located in the channels of the arms and the other support members are clamped to the ring. A separator plate can be built up from sections formed in each pack.

9 Claims, 5 Drawing Figures

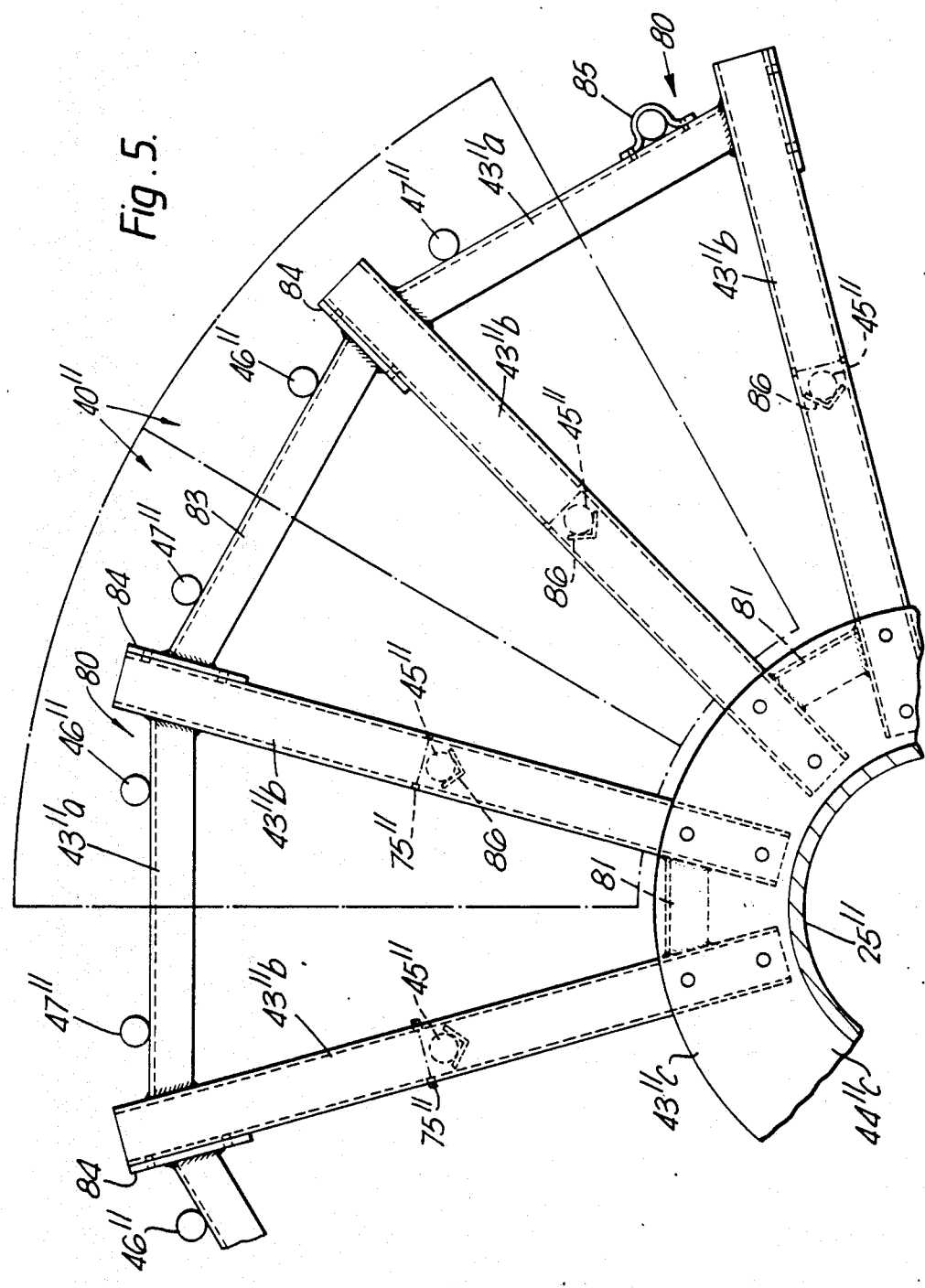

4,692,241

SEWAGE TREATMENT BIOLOGICAL ROTORS

TECHNICAL FIELD

This invention relates to an improved construction of biological rotor for a sewage treatment plant and in particular to a construction which allows the rotor to be transported in sections to the intended operating site of the plant, thereby significantly reducing the transportation costs of the plant and thus viable contract price for the installed plant.

DISCUSSION OF PRIOR ART

It is well known that a mass of sewage-contaminated waste paper can be purified by rotating a plurality of discs disposed in planes normal to the free surface of the waste water, about an axis parallel to the free surface, so that regions of each disc are periodically immersed to collect a thin coating of biomass from the water and periodically exposed to the atmosphere to allow aerobic degeneration of the biomass coating to occur.

Waste water treatment plants which utilise biomass rotors are available in a wide range of sizes (e.g. to treat from 1 m$^3$ to more than 400 m$^3$/day). The larger plants currently manufactured employ rotors some 5000 mm in diameter and fabricating rotors of this size from complete discs and assembling them on the required drive shaft to form the rotor represents no problem in the factory, but transporting such large biomass rotors in assembled condition from the factory to the site does pose problems and is expensive. This is particularly the case when a sea transport link is involved.

It has therefore been proposed to construct each biomass rotor in "knock-down" format, the "discs" being substituted by a plurality of packs of sector-shaped sheets assembled together around the shaft of the rotor. The sheets are usually of a preformed plastics material and up to 50 or more are assembled face-to-face in a pack to provide a very large aggregate biomass support area in each rotor pack. In a known construction, each pack has the sheets thereof penetrated by rigid through-members clamped to spider-like support assemblies disposed in radial planes of the rotor shaft.

This invention relates to an improved form of knock-down biomass rotor and to an improved motor of assembling a knock-down biomass rotor for a waste-water treatment plant.

SUMMARY OF THE INVENTION

According to one aspect of the invention a method of assembling a biomass rotor from sector-shaped packs of preformed plastics sheet having at least two rigid through-members penetrating all the sheets in the pack, the packs being secured between a pair of spider-like support assemblies each extending normal to the axis of a shaft, is characterised in that each support assembly includes a ring concentric with the shaft and channel-shaped arms extending radially inwardly from the ring towards the shaft, the channel-shaped arms in each pair of support assemblies being located in respective axial planes of the shaft with the channels in each coplanar pair opening towards one another, one rigid through-member of each pack having its ends located in the confronting channels of a respective axially coplanar pair of arms and the other, or another, rigid through-member being secured at each end to the respective rings of the pair.

In the case of small rotors, each ring can be a one piece circular ring welded or otherwise fixed to the radial arms. With the larger rotors it can be of advantage to make the circular ring in removable sections so that no component part of the "knocked-down" rotor is larger than the limiting size set by a cargo container used for transporting the rotor to a distant site.

Each ring can be in the form of a regular polygon (e.g. each side of which is a separate removable component). Polygons of 8, 9 and 12 sides are currently in prospect.

The weight of the wet biomass supported by the rotor increases approximately as the square of the diameter and to properly support the weight as the diameter of the rotor increases (e.g. for a 3.00 m, 3.66 m or 4.25 m diameter rotor) it can be an advantage to provide a second or inner "ring" concentric with the shaft tying the channel-shaped arms together approximately midway along their length in the radial direction of the rotor.

Suitably, each channel has a stop member partially obstructing the channel thereof at such a distance from the ring that in the assembled biomass rotor each end of each channel-supported through-member rests against a respective stop member.

Preferably the through-members of each pack are tubes (conveniently stainless steel tubes) and these can be sealed at their ends. Conveniently the end seal of a tubular through-member located in a channel-shaped arm is provided by a cap of synthetic plastics material since these caps can electrically insulate the tube from the arm (allowing the use of metallic materials of different electrochemical potential for the tube and arm without exacerbating corrosion during use), facilitate sliding of the tube end along the channel and resiliently locate the tube in the arm.

A preferred arrangement has three tubes penetrating the sheets of each pack, the channel-located tube being located at the apex of an isosceles triangle whose base corners are defined by the ring-mounted tubes.

The preformed plastics sheets are suitably thermoplastics sheets indented, corrugated or otherwise heat-deformed to improve their rigidity and space each sheet positive from the adjacent sheet(s) in the pack to provide liquid passageways in the pack between adjacent sheets. Desirably, each opening in each sheet to receive a through-member, is formed in a cup-shaped recess of the sheet, since such recesses strengthen the sheet in the vicinity of the opening and provide good location features when sheets are close-packed prior to assembly on the through-members.

A biomass rotor is commonly used in a plurality of serially-connected water-treatment zones and radial plane separator discs are then required to allocate different axial sections of the rotor to the respective zones. When assembling a rotor in accordance with the method of the invention, such a radial plane separator disc can easily be created by including component sector-shaped parts of each disc required, in the same relative position in each pack destined for location between a given pair of support assemblies, so that when all the packs have been put in place, edge regions of adjacent separator components can be connected together to provide a liquid barrier in the required radial plane of the rotor.

An advantage of the assembly method of the invention is that any given pack can be removed without disturbing any other, since each pack can be slid out of the arms, once the securing of the through-member(s) to the rings of the pair of support assemblies has been released.

The invention also extends to a biomass rotor assembled by the method detailed above and to a waste water treatment plant incorporating such a rotor.

BRIEF DESCRIPTION OF THE DRAWINGS

The invention will now be further described, by way of example, with reference to the accompanying drawings, in which:

FIG. 5 is a view similar to FIG. 4, but of a third embodiment of rotor according to the invention.

DESCRIPTION OF PREFERRED EMBODIMENTS

Figure 1:
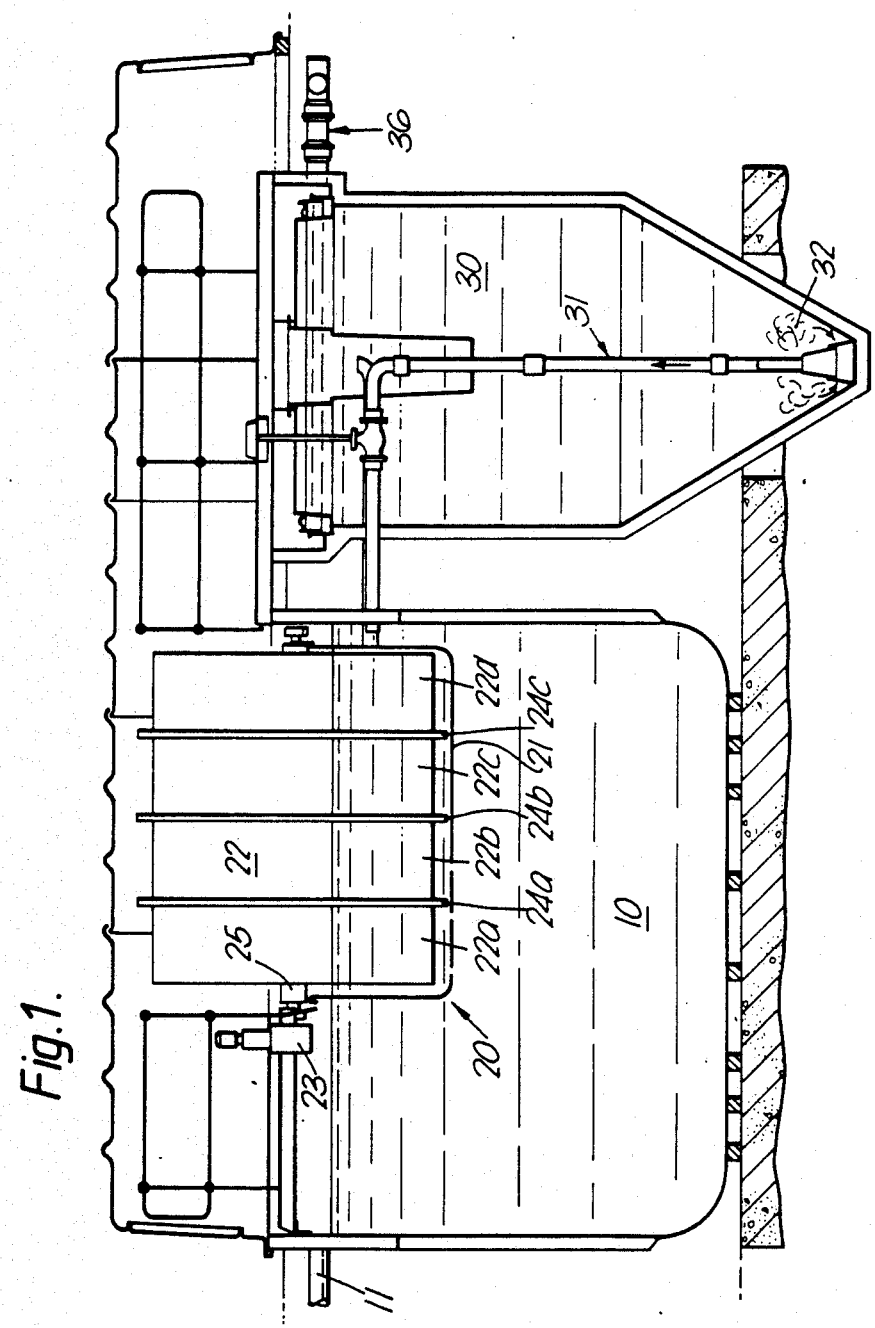
FIG. 1 shows, purely schematically, a vertical section through part of a waste-water treatment plant which includes a biomass rotor according to the invention.

The plant shown in FIG. 1 is designed for the biological purification of raw sewage and comprises a primary settlement tank 10, a bio-zone 20 and a final settlement tank 30.

The bio-zone 20 comprises a housing 21 located in the upper part of the primary tank 10, which housing contains a biomass rotor 22 divided into four sub-sections 22a to 22d. The rotor 22 has a shaft 25 which is rotated by a drive motor/gearbox unit 23 so that the surface areas of the rotor become coated with a thin layer of biomass from the water in the housing 21 and periodically subject these layers to a period in the atmosphere. The microorganisms naturally present in the sewage feed and multiply very rapidly in the cyclic submerged and exposed periods to which they are subjected on the surfaces of the rotor. The micro-organisms rapidly break down the biomass layers.

The raw sewage is fed, via a pipe 11, to the primary tank and from there, after losing its heavier solids (which sink to the bottom of the tank 10 for periodic removal), it passes into the housing 21 adjacent to the first sub-section 22a of the rotor.

Separator 24a, 24b and 24c integral with the rotor 22 come close to the housing 21 and effectively divide the bio zone 20 into its four sub-sections causing the purifying sewage to progress slowly through the housing 21, until eventually the sewage reaches the last sub-section 22d. Openings are provided in the bottom of the housing 21, adjacent to its upstream end, to allow sediment falling off the surfaces of the rotor to drop down into the tank 10, but there will still be some solids matter entrained in the water which enters the final compartment of the housing 21 which defines the last sub-sections 22d.

The liquid from the downstream end of the housing is then led to the final settlement tank 30 from which purified water leaves via a duct 36 and collected sludge 32 is led back into the tank 10 via a pipe 31.

Figure 2:
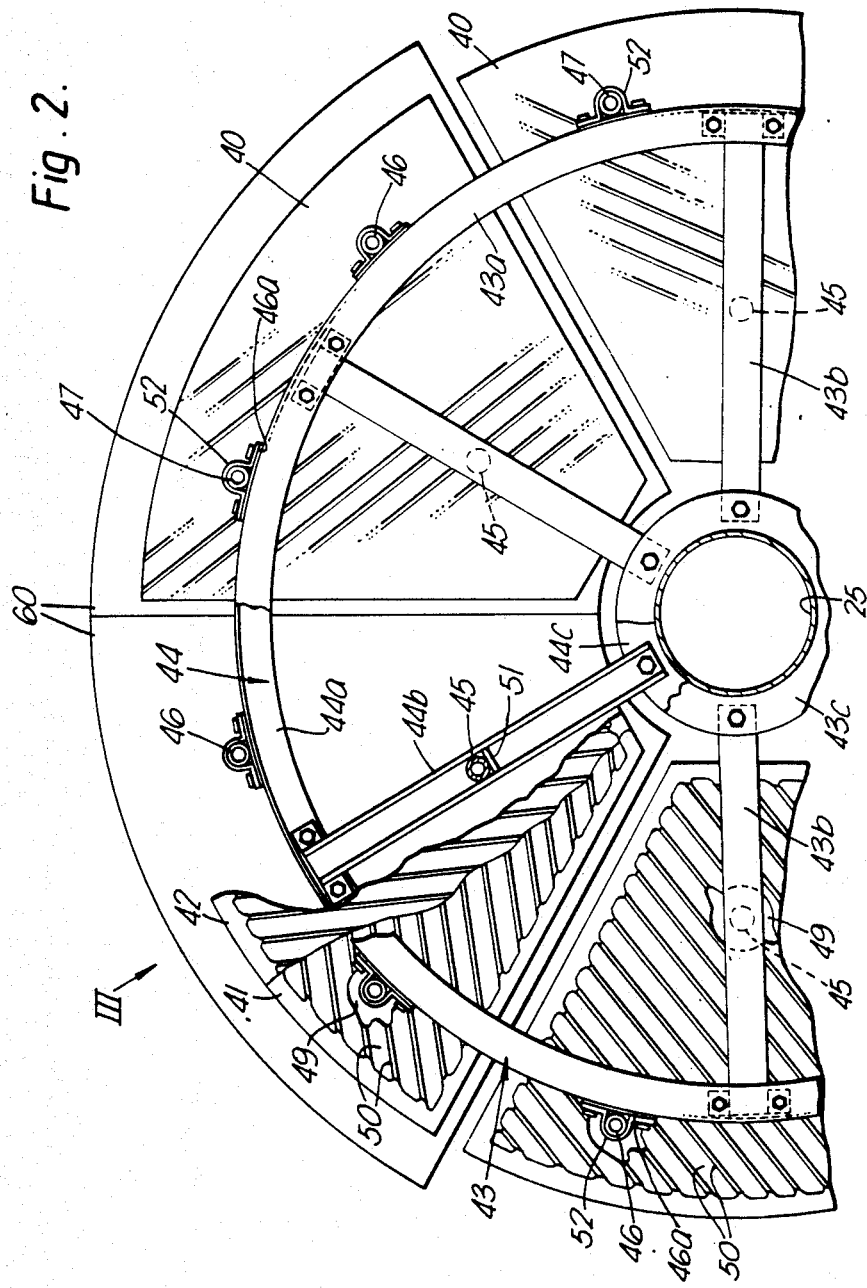
FIG. 2 shows half of the biomass rotor of the plant of FIG. 1 partially sectioned and on an enlarged scale.

FIG. 2 shows part of the construction of the biomass rotor 22 which is constructed in knock-down format from sector shaped packs 40 of biomass support sheets 41, 42, the packs 40 being supported between support assemblies 43, 44 each of which comprises a circular ring 43a, 44a and a number (in the illustrated case six) channel-shaped arms 43b, 44b. The arms of each support assembly are bolted at their inner end to a radial flange (43c, 44c) of the shaft 25 of the rotor, and at their outer ends to the respective ring 43a, 44a and are arranged in pairs axially along the shaft 25 so that for each adjacent pair of support assemblies, there are pairs of arms 43b, 44b which lie in an axial plane with their channels confronting.

Each pack 40 includes a large number of the biomass support sheets 41, 42 (typically 50 or more) which are threaded onto through-tubes 45, 46, 47. Each sheet 41, 42 has a cup-shaped recess 49 surrounding the hole where the respective tube 45–47 is located and has diagonal ribs/grooves 50 to stiffen the plastics sheet from which it was formed, and to space the adjacent sheets one from the other. Two reference numbers 41, 42 have been used for the sheets since the ribs/grooves 50 run at right angles on adjacent sheets, this arrangement ensuring the creation of liquid flow channels throughout the pack 40 and providing a very large surface area in each pack on which the biomass can collect.

Each tube 45 is dimensioned so that the opposite ends thereof slide into the confronting channels of a respective coplanar pair of arms 43b, 44b and a web plate 51 is provided in each channel on which an end of the respective tube 45 can rest when the pack is correctly fitted between the support assemblies 43, 44 of a pair. In this position of the pack 40, the ends of the other two tubes 46, 47 rest against the circumference of the rings 43a, 44a and can then be bolted there with U-shaped brackets 52.

It is preferred to fabricate the tubes 45–47 from stainless steel and the rings 43a, 44a and arms 43b, 44b of galvanised steel. To prevent the electrical connection of metals with different electrochemical potentials, and thus to avoid the risk of accelerated corrosion during use, the tube 45 can be capped at each end with a plastics cap (45a in FIG. 3) which will facilitate sliding of the tube ends along the channels and also provide some measure of resilient location of the tube ends in the arms. Insulating plates (shown at 46a) can be used under the brackets 52 to insulate the outer tubes 46, 47 from the rings 43a, 44a.

In the centre of the rotor 22, one radial flange can support two sets of arms (back-to-back) and the outer ends of these two sets of arms can be bolted to two outer rings so that a maximum of the axial length of a rotor is used for accommodating the packs of biomass support sheets.

The separator plates 24a, 24b, 24c (and of course less than, or more than, three could be provided on a rotor) can be constructed from sector parts, one incorporated in the same relative position in each pack 40 destined to be located between a given pair of support assemblies 43, 44. The separator plate parts (two of which are shown at 60 in FIG. 2) overlap slightly and extend beyond the packs to come to within a couple of centimeters of the cylindrical wall of the housing 21.

Figure 3:
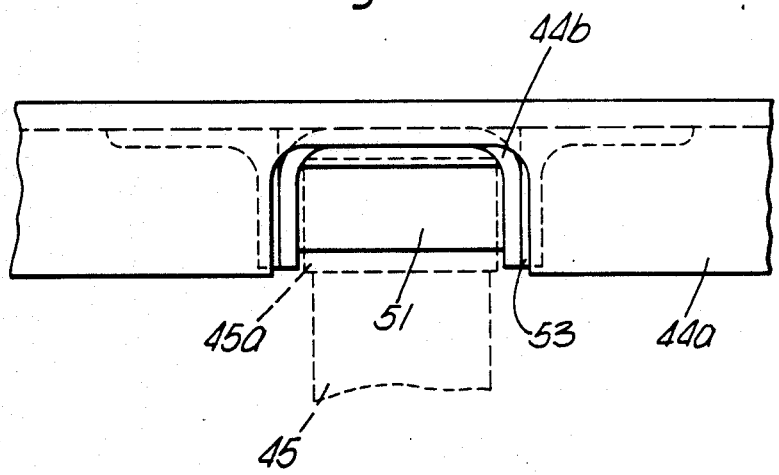
FIG. 3 is a partial view in the direction of the arrow III in FIG. 2.

FIG. 3 shows a recess 53 cut in the ring 44a to allow the end of the tube 45 to pass into the channel of the underlying arm.

The biomass support sheets can be vacuum formed from 0.5 mm thick sheets of black polypropylene. Respective piles of sheets 41 and 42 can be close packed for easy transport, the cup-shaped recesses 49 in each sheet nesting in the recesses of the underlying sheet.

The web plate 51 in the channel-shaped arms 43b, 44b, provides additional support for the disc pack 40 when the latter is out of the water in the housing 21 and the removal of this support when the pack is hanging down from the support assemblies 43, 44 does not matter since the effective weight of the submerged pack 40 is much lower than its true weight.

Figure 4:
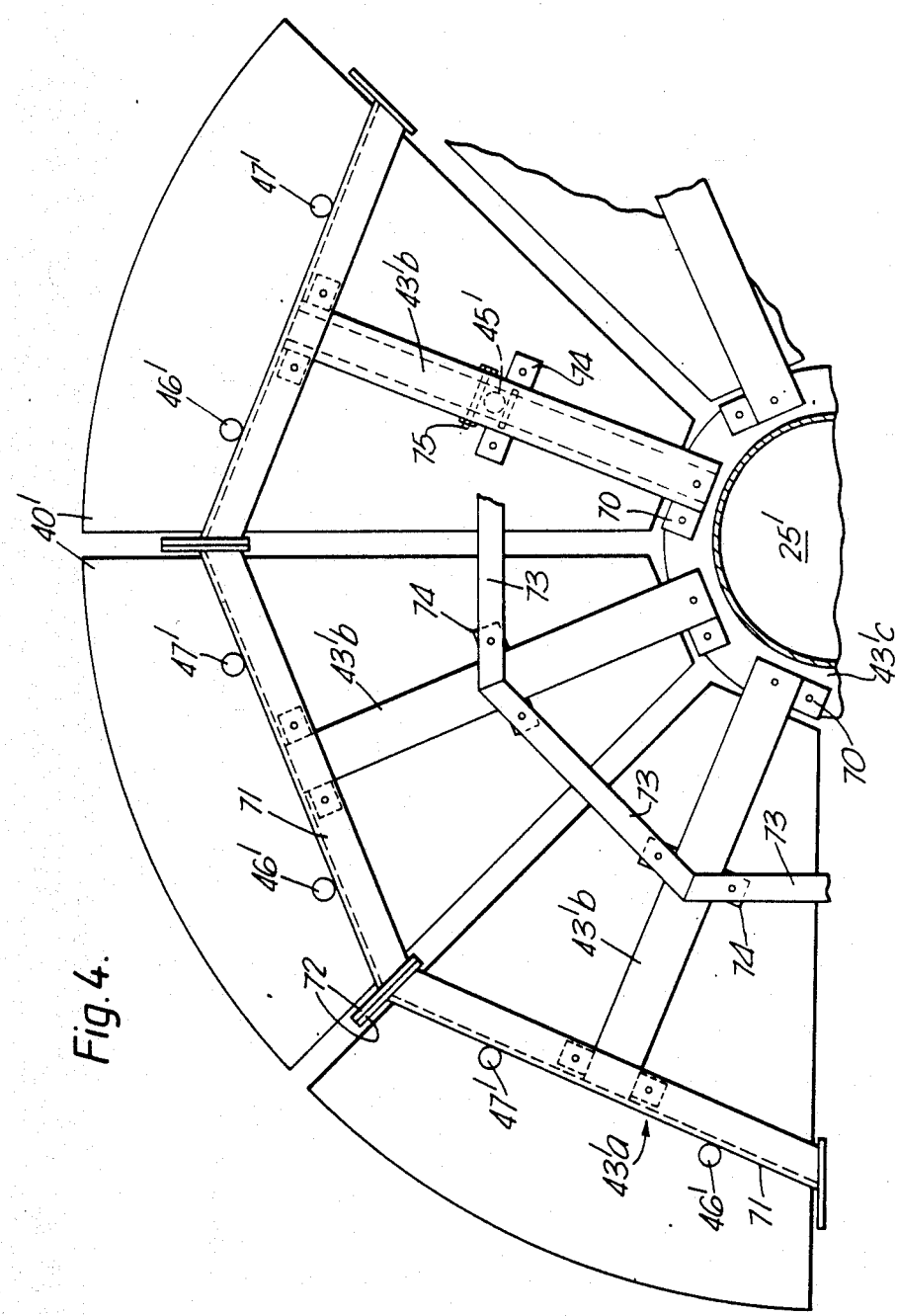
FIG. 4 is a partial end view of a second embodiment of rotor according to the invention.

For convenience, the same reference numerals as have been used to designate rotor parts in FIGS. 1 to 3, have been used in FIG. 4, but with a prime added thereto.

The channel-shaped radial arms 43'b, 44'b are bolted to a respective radial flange 43'c, 44'c of the shaft 25' as in the FIGS. 1 to 3 embodiment but with an additional bolt fixing for each arm provided via a side bracket 70.

The outer end of each arm is bolted (via a pair of brackets) to the respective outer "ring" 43'a, 44'a which in this embodiment is fabricated from angle-section lengths 71 of galvanised steel.

The lengths 71 are welded to flat end plates 72 which are inclined with respect to the elongate direction of the length at an angle appropriate to the number of packs 40' of biomass support sheets used to complete one complete axial section of the rotor. In this way confronting end plates 72 of two adjacent lengths 71 of each support assembly 43', 44' can be bolted together, without clearance therebetween, as the component parts of the rotor frame are assembled on site.

To provide intermediate supports between the arms 43'b, struts 73 are provided which are bolted between brackets 74 projecting outwardly from each radial arm. The ends of each strut 73 are also inclined to ensure a close fit between adjacent strut as the assembly of the support assemblies proceeds.

Each pack 40' includes three stainless steel support tubes 45', 46', 47' in a triangular configuration generally in the same manner as is used in the embodiment of FIGS. 1 to 3, the outer tubes 46', 47' being clamped by arcuate brackets (not shown) to the outer surface of the respective lengths 71 and the ends of the inner tubes 45' being received in the channels of the respective arms 43'b, 44'b. To aid in supporting the greater mass of the packs 40' in a larger rotor, a bolt 75 can be passed through each arm 43'b, 44'b, radially outwardly of the respective tube 45', to aid in supporting the pack 40' when it is disposed in the lower half of the rotor during turning of the latter.

One particular advantage of the knock-down construction featured in this application is that the framework can be built up, section by sector, and the entire framework can be completed before there is a need to locate any of the packs 40' therein.

Although it is preferred to use bolted joints to connect the integers together it is not ruled out that at least some of the joints could be effected by welding.

In place of one bracket 70 on the proximate end of each arm 43'b, 44'b, a pair of brackets (similar to the brackets 74) could be used.

FIG. 5 shows a third embodiment of rotor construction in which double primes have been used to distinguish similar integers.

In FIG. 5, a plurality of generally A-shaped frames 80 are bolted to the respective radial flange 43"c, 44"c of the shaft 25". Each A-frame 80 comprises a pair of channel-shaped radial arms 43"b linked inwardly by stays 81 and outwardly by angle section "ring" stays 43"a. Adjacent arms 43"b of adjacent A-frames 80 are linked by bridging angle section stays 83 each provided at each end by welded-on flange plates 84.

Each sector-shaped pack 40" includes three support tubes 45", 46" and 47" in a triangular configuration (as described in the previous embodiments) the outer tubes 46" and 47" being clamped by arcuate brackets (one of which is shown at 85) to the respective stays 43"a and 83 so that an arm 43"b is located mid-way between them. One end of the inner tube 45" is located in the channel of the respective arm 43"b resting on an angle support 86 and held captive in that position by a bolt 75".

A ring of A-frame 80 is used on each side of each complete axial section of the rotor as in the previously described embodiments, and in all but the axially outermost sections of the rotor, two A-frames and two bridging stays 83 are clamped together back-to-back.

I claim:

1. A method of assembling a biomass rotor from sector-shaped packs of preformed plastics sheets having (at least two) a triangular array of three rigid through-members penetrating all the sheets in the pack, comprising the steps of securing the packs between a pair of spider-like support assemblies each extending normal to the axis of a shaft to thereby constitute a coplanar pair and each including arranging a ring concentric with the shaft and extending radial arms inwardly from the ring towards the shaft, locating the radial arms in each pair of support assemblies in respective axial planes of the shaft, securing two rigid through members of each pack at each end to the respective rings of the pair, characterized by forming each of the radial arms as channel-shaped members with the channels in each coplanar pair opening towards one another to thereby confront each other and by locating ends of the remaining rigid through-member of each pack in the confronting channels of a respective axially coplanar pair of raidal arms.

2. A method according to claim 1, characterised by making up the ring of each support assembly from a polygonal array of pack-support stays linking adjacent radially extending arms.

3. A method according to claim 1, characterized by welding together one pack-support stay and two radially extending arms to form an A-frame, and linking together adjacent A-frames to separately fixed pack-support stays that complete the ring.

4. A biomass rotor comprising a plurality of sector-shaped packs of preformed plastics sheets, each pack having three rigid through-members penetrating all the sheets in the pack, the packs being secured between a pair of spider-like support assemblies each extending normal to the axis of a shaft of the rotor to thereby constitute a coplanar pair, each support assembly including a ring concentric with the shaft and radial arms extending inwardly from the ring towards the shaft, the arms in each pair of support assemblies being located in respective axial planes of the shaft, two of the rigid through-members being secured at each end to the respective rings of the pair, characterized in that each radial arm is a channel-shaped member with the channels in each coplanar pair opening towards one another to thereby confront each other, the remaining rigid through-member of each pack having its ends located in the confronting channels of a respective axially coplanar pair of radial arms.

5. A biomass rotor according to claim 4, characterised in that each channel has a stop member partially obstructing the channel thereof at such a distance from the ring that in the assembled biomass rotor each end of each channel-supported through-member rests against a respective stop member.

6. A biomass rotor according to claim 5, characterised in that each sector-shaped pack has three tubes penetrating the sheets of the pack, the channel-located tube being located at the apex of an isosceles triangle whose base corners are defined by the ring-mounted tubes.

7. A biomass rotor according to claim 4, characterised in that the preformed plastics sheets of each pack are thermoplastics sheets heat-deformed to improve their rigidity and space each sheet positively from the adjacent sheet(s) in the pack to provide liquid passageways in the pack between adjacent sheets.

8. A biomass rotor according to claim 7, characterised in that each opening in each sheet provided to receive a through-member is formed in a cup-shaped recess of the sheet to strengthen the sheet in the vicinity of the opening and provide good location features when sheets are close-packed prior to assembly on the through-members.

9. A biomass rotor according to claim 4, in which a radial plane separator disc is provided in the rotor characterised in that such a radial plane separator disc is created by including component sector-shaped parts of each disc in the same relative position in each pack destined for location between a given pair of support assemblies, so that when all the packs have been put in place, edge regions of adjacent separator components can be connected together to provide a liquid barrier in the required radial plane of the rotor.

* * * * *